United States Patent [19]

Shiga et al.

[11] 4,304,892
[45] Dec. 8, 1981

[54] OLEFIN POLYMERIZATION CATALYST

[75] Inventors: Akinobu Shiga; Yoshiharu Fukui, both of Niihama; Kazuhiro Matsumura, Ashiya; Toshio Sasaki; Masahisa Okawa, both of Niihama, all of Japan

[73] Assignee: Sumitomo Chemical Co., Ltd., Osaka, Japan

[21] Appl. No.: 166,873

[22] Filed: Jul. 8, 1980

Related U.S. Application Data

[60] Division of Ser. No. 41,972, May 23, 1979, Pat. No. 4,246,135, which is a continuation-in-part of Ser. No. 920,888, Jun. 30, 1978, abandoned.

[30] Foreign Application Priority Data

Jun. 30, 1977 [JP] Japan ................. 52-78655

[51] Int. Cl.³ .................... C08F 4/64; C08F 10/06
[52] U.S. Cl. .................... 526/137; 526/142; 526/351
[58] Field of Search .................... 526/137, 142

[56] References Cited
U.S. PATENT DOCUMENTS 4,060,593 11/1977 Kozuo et al. .................... 526/142

*Primary Examiner*—Edward J. Smith
*Attorney, Agent, or Firm*—Sughrue, Mion, Zinn, Macpeak and Seas

[57] ABSTRACT

A process for producing a solid titanium trichloride catalyst which comprises
at a temperature of −40° C. to 40° C. mixing titanium tetrachloride with an organo-aluminum compound of the formula (I):

$$AlR_nX_{3-n} \qquad (I)$$

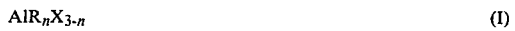

wherein R has up to 10 carbon atoms and is an aliphatic hydrocarbon group which may be straight chain, branched chain or cyclic, or an aromatic hydrocarbon group; X is a halogen atom or a hydrogen atom; and n is a number satisfying the relation, $1.5 \leq n \leq 3$;
in the presence of an ether compound of the formula (II):

$$R^2OR^3 \qquad (II)$$

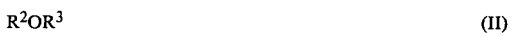

wherein $R^2$ and $R^3$, which may be the same or different, each is an alkyl group, an aralkyl group or an alkenyl group, each having up to 10 carbon atoms, to reduce the titanium tetrachloride; maintaining the mixed solution at a temperature of 10° C. to 50° C. thereby performing the reduction;
at the time when the reduction reaction proceeds at least 90%, adding iodine to the resulting liquid titanium trichloride product;
maintaining the resulting mixture at a temperature of about 30° C. to about 150° C. after the addition thereby precipitating solid titanium trichloride; and
then separating the solid titanium trichloride.

17 Claims, No Drawings

OLEFIN POLYMERIZATION CATALYST

CLOSE REFERENCE TO RELATED APPLICATION

This is a division of application Ser. No. 41,972, filed May 23, 1979, now U.S. Pat. No. 4,246,135 which is a continuation-in-part of application Ser. No. 920,888, filed June 30, 1978, now abandoned.

BACKGROUND OF THE INVENTION

1. Field of the Invention

The present invention relates to a process for producing a catalyst capable of being used to produce olefin polymers with high crystallinity, and a process for producing such olefin polymers with this catalyst.

2. Description of the Prior Art

It is well known that olefin polymers with high crystallinity can be produced using the so-called Ziegler-Natta catalyst comprising a compound of a transition metal of Groups IV to VI of the Periodic Table and a metal of Groups I to III of the Periodic Table or an organo-compound thereof.

In the industrial production of olefin polymers, such as propylene polymers and butene-1 polymers, titanium trichloride compositions are particularly used as catalysts. In this process, however, amorphous polymers are produced as by-products in addition to olefin polymers with high stereo-regularity, the latter polymers being very valuable industrially.

Amorphous polymers have little industrial value and adversely affect to a great extent the mechanical properties of the processed products of olefin polymers, such as films, fibers and the like.

Further, the formation of the amorphous polymers uselessly consumes monomer starting material, and at the same time, equipment for removal of the amorphous polymers becomes necessary. This is a very serious disadvantage from an industrial point of view.

Consequently, it would be quite advantageous if the formation of such amorphous polymers could be completely or, at least, substantially inhibited.

Further, catalyst residues remain in the olefin polymers produced by this polymerization process and adversely affect the stability and processability of the polymers produced. Accordingly, equipment for removal of catalyst residues and for stabilization of the polymers becomes necessary.

These disadvantages in the polymerization process can be improved by increasing the catalytic activity which is expressed as the yield of olefin polymer per unit weight of catalyst. Thus, equipment for removal of the catalyst residues becomes unnecessary and, thus, a reduction in the manufacturing cost of the olefin polymer also becomes possible.

Titanium trichloride used for such purpose is obtained by (1) reducing titanium tetrachloride with hydrogen, followed by activation by powdering in a ball-mill, (2) reducing titanium tetrachloride with metallic aluminum, followed by activation by powdering in a ball-mill, and (3) reducing titanium tetrachloride with an organo-aluminum compound at −30° C. to 30° C. and heat-treating the resulting β-type titanium trichloride at 120° C. to 180° C. to change the crystal form thereof.

However, none of the titanium trichloride catalysts thus-obtained is satisfactory in terms of the catalytic activity and the stereo-regularity of polymers produced therewith.

Further, other various processes for producing titanium trichloride have been proposed. For example, a process wherein β-type titanium trichloride is treated with a complexing agent and then with titanium tetrachloride is disclosed in Japanese Patent Application (OPI) No. 34478/1972 (The term "OPI" as used herein refers to a "published unexamined Japanese patent application"). Also, processes wherein titanium trichloride compositions obtained in the foregoing processes are treated with a complexing agent, or co-pulverized in a ball-mill, followed by washing with a solvent, are well known.

Further, processes for producing titanium trichloride by reduction of titanium tetrachloride with an organometallic compound in the presence of an electron-donating compound, such as an ether, are well known. For example, (1) a process comprising reducing titanium tetrachloride with an organo-magnesium or organo-aluminum compound in an ether medium, followed by ageing at 150° C. to 200° C. (e.g., as disclosed in Japanese Patent Publication No. 8768/1971), (2) a process comprising reducing titanium tetrachloride with an organo-aluminum compound at 160° C. to 200° C. in an ether solvent (e.g., as disclosed in U.S. Pat. No. 3,558,271), and (3) a process comprising reducing titanium tetrachloride with an organo-aluminum compound in an aromatic solvent in the presence of polyoxyethylene or polyoxypropylene, followed by heat-treating in the vicinity of the boiling point of the titanium tetrachloride (e.g., as disclosed in Japanese Patent Application (OPI) No. 27285/1972) are known. Also, processes for producing a solid titanium trichloride comprising treating titanium tetrachloride with an organo-aluminum compound in the presence of an ether to produce a liquid product, followed by heat-treatment at 150° C. or less, are disclosed in Japanese Patent Application (OPI) Nos. 16298/1976, 76196/1976, 90998/1976, and 94496/1976.

Various processes for producing titanium trichloride catalysts with iodine or an iodine compound have been proposed. For example, processes wherein titanium trichloride is treated with iodine, bromine or an iodine or bromine compound are disclosed in Japanese Patent Application (OPI) Nos. 9178/1976, 81889/1976, and 117787/1976.

The present inventors proposed a process wherein titanium trichloride compositions are reacted with an ether compound in the presence of iodine or an iodine compound (Japanese Patent Application No. 108276/1976).

Also, a process wherein the liquid product, which is obtained by treating titanium tetrachloride with an organo-aluminum compound in the presence of an ether compound and iodine or an iodine compound, is contacted with a releasing agent (e.g., a Lewis acid) at 150° C. or less to obtain a solid titanium trichloride is disclosed in Japanese Patent Application (OPI) No. 46598/1976. The description in Japanese Patent Application (OPI) No. 46598/1976 on the time the iodine or the iodine compound is added in the process is that such "is added prior to the reduction treatment, but, if in a substantial reduction term, it may be added after the reduction treatment is carried out. The term, substantial reduction term, means the time when the reduction of the titanium tetrachloride is not yet finished". Particularly, the following description "The effect of the present invention is not displayed even though iodine or an iodine compound is added after completion of the reduction" appears.

SUMMARY OF THE INVENTION

In order to obtain a catalyst which has a higher catalytic activity and which can be used to produce crystalline olefin polymers of even superior stereo-regularity than can be produced using the well known processes described above, extensive studies on the reduction in the presence of an ether compound, the time when the iodine is added, and the reaction conditions have now been conducted. As a result, it has now been surprisingly found that when an olefin is polymerized using the solid titanium trichloride catalyst obtained by reducing titanium tetrachloride with an organo-aluminum compound in the presence of an ether compound and, after the reduction reaction proceeds at least 90%, adding iodine to the reaction mixture and maintaining the mixture at 150° C. or less thereby precipitating solid titanium trichloride, the catalytic activity of the catalyst and the stereo-regularity and bulk density of olefin polymers produced therewith are markedly improved in comparison with the case of the solid titanium trichloride catalyst produced by heat-treatment at 150° C. or less in the absence of iodine and, further, the effect of improvement is much more superior than in the case wherein iodine or an iodine compound is present during the reduction term. Thus, the present invention has been obtained.

An object of the present invention is to provide a process for producing catalysts having a high catalytic activity in the polymerization of olefins and capable of being used to produce olefin polymers with high stereo-regularity and bulk density.

Another object of the present invention is to provide a process for producing olefin polymers by polymerization of olefins with the catalyst of this invention.

These and other objects and advantages will become apparent from the following description of the invention.

Accordingly the present invention in one embodiment provides a process for producing a solid titanium trichloride catalyst which comprises at a temperature of −40° C. to 40° C. mixing titanium tetrachloride with an organo-aluminum compound of the formula (I):

$$AlR_nX_{3-n} \qquad (I)$$

wherein R has up to 10 carbon atoms and is an aliphatic hydrocarbon group which may be straight chain, branched chain or cyclic, or an aromatic hydrocarbon group; X is a halogen atom or a hydrogen atom; and n is a number satisfying the relation, $1.5 \leq n \leq 3$;
in the presence of an ether compound of the formula (II):

$$R^2OR^3 \qquad (II)$$

wherein $R^2$ and $R^3$, which may be the same or different, each is an alkyl group, an aralkyl group or an alkenyl group, each having up to 10 carbon atoms to reduce the titanium tetrachloride; maintaining the mixed solution at a temperature of 10° C. to 50° C. thereby performing the reduction of titanium tetrachloride;
at the time when the reduction proceeds at least 90%, adding iodine to the resulting liquid titanium trichloride product;
maintaining the resulting mixture at a temperature of about 30° C. to about 150° C. after the addition thereby precipitating solid titanium trichloride; and
then separating the solid titanium trichloride.

This invention also provides, in another embodiment, a process for producing olefin polymers which comprises
polymerizing an olefin with a catalyst system comprising the solid titanium trichloride catalyst produced as described above and an activating agent of the formula (III):

$$AlR'_mY_{3-m} \qquad (III)$$

wherein R' has up to 10 carbon atoms and is an aliphatic hydrocarbon group which may be straight chain, branched chain or cyclic, or an aromatic hydrocarbon group; Y is a halogen atom or a hydrogen atom; and m is a number satisfying the relation, $1 \leq m \leq 3$.

DETAILED DESCRIPTION OF THE INVENTION

In the present invention, the solid titanium trichloride catalyst is produced as described below. Before separating the solid titanium trichloride from the liquid titanium trichloride product obtained by reducing titanium tetrachloride with an organo-aluminum compound of the formula (I) in the presence of an ether compound of the formula (II), iodine is added to the liquid titanium trichloride product which is then maintained at about 30° C. to 150° C. to obtain a solid titanium trichloride precipitate.

In the present invention, suitable examples of the organo-aluminum compound of the formula (I):

$$AlR_nX_{3-n} \qquad (I)$$

wherein R has up to 10 carbon atoms and is an aliphatic hydrocarbon group which may be straight chain, branched chain or cyclic, or an aromatic hydrocarbon group; X is a halogen atom or a hydrogen atom; and n is a number satisfying the relation, $1.5 \leq n \leq 3$;
which is used for the reduction of titanium tetrachloride include preferably alkylaluminum sesquihalides, dialkylaluminum halides, trialkylaluminums and dialkylaluminum hydrides.

Specific examples of organo-aluminum compounds of the formula (I) include methylaluminum sesquichloride, ethylaluminum sesquichloride, dimethylaluminum chloride, diethylaluminum chloride, di-n-propylaluminum chloride, trimethylaluminum, triethylaluminum, triisobutylaluminum, ethyl dicyclohexyl aluminum, triphenylaluminum, diethylaluminum hydride, diisobutylaluminum hydride and the like. Of these compounds, ethylaluminum sesquichloride, diethylaluminum chloride, triethylaluminum and diethylaluminum hydride are preferred, and diethylaluminum chloride is particularly preferred.

The ether compound used for the reduction is represented by the formula (II):

$$R^2OR^3 \qquad (II)$$

wherein $R^2$ and $R^3$, which may be the same or different, each is an alkyl group, an aralkyl group or an alkenyl group, each having up to 10 carbon atoms. Preferred ether compounds of the formula (II) are those in which $R^2$ and $R^3$ each is an alkyl group having 2 to 5 carbon atoms. Specific examples of ether compounds of the formula (II) include diethyl ether, di-n-propyl ether, di-n-butyl ether, di-n-amyl ether, diisoamyl ether, n-amyl n-butyl ether, n-amyl isobutyl ether, n-amyl ethyl ether, n-butyl ethyl ether, n-butyl isoamyl ether, n-butyl n-propyl ether and the like. Of these compounds, di-n-butyl ether and diisoamyl ether are preferred, and di-n-butyl ether is particularly preferred.

The amount of organo-aluminum compound of the formula (I) used as a reducing agent is about 0.2 to about 1.1 moles per mole of titanium tetrachloride. More preferably, such amounts are sufficient that, by reaction between the organo-aluminum compound and titanium tetrachloride, substantially all of the titanium tetrachloride is converted to titanium trichloride and the organo-aluminum compound is substantially changed to aluminum chloride. In other words, in the reduction, the chemical equivalent of the organo-aluminum used is substantially the same as those of the titanium tetrachloride. Preferably, the chemical equivalent of organo-aluminum compound in the reduction reaction is 1 to 1.2 times of that of titanium tetrachloride. For example, the amount is 0.5 mole with diethylaluminum chloride, and the amount is 0.33 mole with triethylaluminum per mole of titanium tetrachloride.

The amount of the ether compound of the formula (II) used is generally about 0.1 to about 3 moles, preferably 0.5 to 1.5 moles, per mole of titanium tetrachloride.

The reduction of the titanium tetrachloride with the organo-aluminum compound in the presence of the ether compound can be carried out in various ways, for example, as follows:

(1) The organo-aluminum compound diluted with a hydrocarbon solvent is added to a mixed solution of the titanium tetrachloride and the ether compound in a hydrocarbon solvent, or, alternatively, the mixed solution of the titanium tetrachloride and the ether compound is added to the organo-aluminum compound.

(2) A mixed solution of the ether compound and the organo-aluminum compound in a hydrocarbon solvent is added to the titanium tetrachloride diluted with a hydrocarbon solvent, or, alternatively, the titanium tetrachloride is added to the mixed solution of the organo-aluminum compound and the ether compound.

(3) A mixed solution of the organo-aluminum compound and the ether compound in a hydrocarbon solvent is added to a mixed solution of the titanium tetrachloride and the ether compound in a hydrocarbon solvent, or, alternatively, the mixed solution of the titanium tetrachloride and the ether compound is added to the mixed solution of the organo-aluminum compound and the ether compound.

Suitable hydrocarbon solvents which can be used for the reduction include saturated aliphatic hydrocarbons, alicyclic hydrocarbons and aromatic hydrocarbons are used. Specific examples of such solvents include n-pentane, n-hexane, n-heptane, n-octane, n-decane, liquid paraffin, cyclohexane, methylcyclohexane, decalin, benzene, toluene, xylene and the like. Of these hydrocarbons, aromatic hydrocarbon solvents are preferred.

Once the reduction of the titanium tetrachloride with the organo-aluminum compound in the presence of the ether compound proceeds at least 90%, preferably at least 95%, more preferably 100%, iodine is added to the reaction mixture and the reaction is carried out at about 150° C. or less in the presence of both the iodine and the ether compound. The amount of iodine used for this reaction is about 0.01 to about 1.0 mole, preferably 0.03 to 0.5 mole, per mole of titanium tetrachloride.

The solid titanium trichloride catalyst obtained from this reaction at about 30° C. to 150° C. with the addition of iodine has remarkably improved catalytic activity, and the stereo-regularity and bulk density of polymers produced therewith are markedly improved as compared with the case with the solid titanium trichloride obtained by heat-treatment at about 150° C. or less without use of the iodine.

The time when the iodine is added is an important factor governing the catalyst performance. According to the disclosure in Japanese Patent Application (OPI) No. 46598/1976, the effect of improving the catalyst performance is not displayed when iodine or an iodine compound is not added before completion of the reduction. As a result of detailed investigations on the reduction, the time at which the iodine is added and methods on how to add the iodine, it has now been surprisingly found that when the iodine is added after substantial completion of the reduction as defined above followed by reaction at about 30° C. to 150° C., even more marked effects on improvement in catalytic activity and in the stereo-regularity and the bulk density of olefin polymers produced therewith are obtained than in the case wherein iodine is added before the completion of the reduction. This may be considered to be due to the following reason. Reactions between iodine and an organo-aluminum compound represented by the following reaction formulae are well known:

$$AlR_3 + I_2 \rightarrow AlR_2I + RI \qquad (1)$$

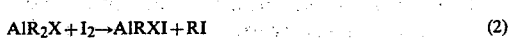

$$AlR_2X + I_2 \rightarrow AlRXI + RI \qquad (2)$$

$$AlRX_2 + I_2 \rightarrow AlX_2I + RI \qquad (3)$$

wherein R is an alkyl group, an alicyclic hydrocarbon group or an aromatic hydrocarbon group and X is a halogen atom. Consequently, when iodine is present in the reaction system wherein the reduction of the titanium tetrachloride with an organo-aluminum compound has not yet been substantially completed, the foregoing reactions (1) to (3) take place whereby iodine is consumed and the RI compound is formed. Therefore, adding iodine during the reduction substantially corresponds to the reduction in the presence of the RI compound produced by reactions (1) to (3). It is apparent that this is completely different from the process of the present invention in which, after reduction of the titanium tetrachloride with the organo-aluminum compound in the presence of the ether compound is substantially finished, iodine is added to the resulting liquid titanium trichloride product. By analysis of the resulting solid titanium trichloride catalyst, it was actually found as described hereinafter that the catalysts of the present invention contain iodine, but that those of the prior art in which iodine is added during the reduction do not contain any iodine. The presence of iodine in the solid catalyst may be considered to be a factor for improving catalytic activity, and the stereo-regularity and bulk density of polymers produced therefrom. Thus, the iodine is added after the reaction of organo-aluminum compound with the titanium tetrachloride proceeds at least 90%.

The reduction reaction is carried out as follows:

Titanium tetrachloride and the organo-aluminum compound are mixed at −40° C. to 40° C., preferably −20° C. to 30° C., more preferably −10° C. to 30° C. over a period of 5 minutes to 6 hours, preferably 10 minutes to 3 hours. Subsequently the reduction reaction is carried out at 10° C. to 50° C., preferably 20° C. to 50° C. for 1.5 to 6 hours, preferably 2 to 4 hours whereby the reduction reaction proceeds at least 90%, in other words, the conversion from $Ti^{+4}$ to $Ti^{+3}$ is at least 90%, whereafter iodine is added to the system.

The time required for the reaction depends upon the reduction temperature, but routine analysis can be used to determine the reduction reaction conversion. The conversion in the reduction reaction is represented by the following equation:

$$\text{Conversion} = \frac{Ti^{+3}}{Ti^{+3} + Ti^{+4}} \times 100\%$$

The amounts of $Ti^{+3}$ and $Ti^{+4}$ in the reaction system can be easily determined with ordinary analytical techniques such as oxidation-reduction titration, atomic absorption analysis and the like.

It is preferred for the iodine to be added before solid titanium trichloride is completely precipitated from the liquid reaction product.

After a titanium tetrachloride solution was mixed with, for example, a diethylaluminum chloride solution in the presence of an ether compound, the reaction was carried out at room temperature (e.g., about 25° C.) for 2.5 hours, and the resulting liquid reaction product was analyzed for $Ti^{+4}$ and $Ti^{+3}$, $Ti^{+4}$ was not detected. Only $Ti^{+3}$ (based on 1 mole of titanium tetrachloride charged) was detected.

Iodine may be added in the form of a solid or as a solution in an inert hydrocarbon solvent, such as hexane, heptane, toluene, etc. The addition temperature is not particularly limited but is preferably about 0° C. to 100° C., more preferably about 0° C. to 50° C. Generally, the addition temperature is within the same temperature range as used in the subsequent treatment.

After addition of the iodine, the resulting mixture is maintained at about 30° C. to about 150° C., preferably 50° C. to 150° C., more preferably 80° C. to 130° C., to treat the liquid titanium trichloride product with the mixture of the iodine and the ether compound. By this treatment, a solid is precipitated. A suitable treating time is generally about 10 minutes or more, but preferably ranges from about 30 minutes to about 5 hours.

After the treatment is finished, the solid is separated. For example, the novel solid titanium trichloride catalyst is obtained by removing the supernatant liquor from the reaction solution, followed by repetition of washing with an inert hydrocarbon solvent such as hexane, heptane, toluene, etc.

Some of the advantageous characteristics of the solid titanium trichloride catalysts produced by the process of the present invention are described below. The catalysts of this invention have remarkably improved catalytic activity as compared with well known conventional catalysts and, particularly, the catalysts of this invention display a marked effect in improving the stereo-regularity and bulk density of olefin polymers produced therewith. These aspects are related in that the content of the aluminum compound in the solid titanium trichloride catalyst is abnormally small, and in that the catalyst contains iodine. The content of the aluminum compound in the catalyst is at the most 2% on a molar basis (converted to an aluminum chloride basis) per mole of titanium trichloride. In contrast, solid catalysts obtained without iodine contain 2 to 5% on a molar basis of aluminum chloride. Also, the solid catalysts of the present invention contain iodine in the form of iodine ion, and the iodine content is 0.1 to 5% on a molar basis per mole of titanium trichloride.

Since polymerization of olefins takes place at the surface of catalyst, it is easily assumed that the structure and composition of the surface of the catalyst greatly affect the catalytic activity and the stereo-regularity of polymers produced therewith. Particularly, in order to obtain information on the composition of the surface of solid titanium trichloride catalyst, an analysis by X-ray photoelectron spectroscopy (abbreviation: XPS or ESCA) was carried out using a DuPont ESCA 650B spectroscope (produced by Shimadzu Seisakusho Co.). As a result, it was found that the solid titanium trichloride catalysts of the present invention had peaks, $Ti_{2p,3/2}$, $Cl_{2p}$ and $I_{3d,5/2}$, and that the relative intensity of the peaks was as follows:

$Ti_{2p,3/2}:Cl_{2p}:I_{3d,5/2}=1:0.55-0.90:0.01-0.05$, assuming the intensity of $Ti_{2p,3/2}$ to be 1. However, no peak, $Al_{2p}$ was detected at all. In the case of the solid titanium trichloride obtained without the iodine present, peaks, $Ti_{2p,3/2}$, $Cl_{2p}$ and $Al_{2p}$, were detected, which means that aluminum atoms are present on the surface of the catalyst. Also, the relative intensity of the peaks was as follows:

$Ti_{2p,3/2}:Cl_{2p}:Al_{2p}=1:0.8-1.3:0.005-0.03$.

Again assuming the intensity of $Ti_{2p,3/2}$ to be 1, the solid titanium trichloride catalysts of the present invention have many iodine atoms but no aluminum atoms on the surface thereof, while those catalysts which are obtained without the iodine present have aluminum atoms on the surface thereof. From this result, it is apparent that the two catalysts are different from each other in terms of surface composition, and that this difference greatly affects catalytic activity and the stereo-regularity of polymers produced therewith.

Even when iodine is added, however, the process disclosed in Japanese Patent Application (OPI) No. 46598/1976 in which iodine is added before completion of the reduction produces a solid titanium trichloride catalyst which does not contain any iodine atoms. Thus, the presence of iodine atoms in the solid titanium trichloride catalysts of the present invention may be considered to be the cause of the improvement in the catalytic activity, and the stereo-regularity and bulk density of the polymers produced therewith.

The solid titanium trichloride catalysts of the present invention are represented by the formula:

$TiCl_3(AlCl_3)_p(E)_q(I)_r$ wherein E is an ether compound represented by the formula $R^2OR^3$ wherein $R^2$ and $R^3$ are as described above, and p, q and r are numbers satisfying the relations, $0<p<0.02$, $0<q<0.15$ and $0.001<r<0.05$, respectively.

Olefin polymers having a high bulk density can be obtained using the solid titanium trichloride catalysts of the present invention. The polymers obtained with the titanium trichloride compositions of the prior art have a bulk density of only about 0.3 g/ml at the most, while the polymers obtained with the solid catalysts of the present invention have a bulk density of about 0.37 g/ml or more.

The specific surface area of the solid titanium trichloride catalysts of the present invention is small, and is 30 m²/g or less as measured by the BET method.

Suitable activating agents of the formula (III):

$$AlR'_m Y_{3-m} \qquad (III)$$

wherein R' has up to 10 carbon atoms and is an aliphatic hydrocarbon group which may be straight chain, branched chain or cyclic, or an aromatic hydrocarbon group; Y is a halogen atom or a hydrogen atom and m is a number satisfying the relation, $1 \leq m \leq 3$, constituting the catalysts for olefin polymerization of the present invention include dialkylaluminum halides, trialkylaluminums, dialkylaluminum hydrides and the like which are preferred. Particularly, diethylaluminum chloride is preferred.

In the polymerization of olefins, the molar ratio of the solid titanium trichloride catalyst to the activating agent of the formula (III) can be selected within a wide range of about 10:1 to about 1:500. Molar ratios ranging from 2:1 to 1:200 are preferably used.

The polymerization can be carried out at about −30° C. to about 200° C. Usually, however, temperatures of 0° C. to 100° C. are preferred because at a temperature lower than 0° C., the rate of polymerization decreases, while at a temperature of more than 100° C., highly stereo-regular polymers are not obtained.

The polymerization pressure is not particularly limited, but for commercial and economic reasons, pressures of about 3 to about 100 atmosphere are desirable.

The polymerization can be carried out either in a continuous manner or in a batchwise manner.

Suitable olefins which can be used in the polymerization process of the present invention are α-olefins having 2 to 10 carbon atoms, for example, ethylene, propylene, butene-1, pentene-1, hexene-1, 3-methylpentene-1 and 4-methylpentene-1. The present invention is not to be construed as being limited to these compounds, however.

The polymerization of the present invention includes a homopolymerization and a copolymerization. In the copolymerization, two or more olefins are mixed and contacted with the catalyst system to obtain copolymers. Copolymerization in two or more stages to produce heteroblock copolymers can also be easily performed using the polymerization of the present invention.

The polymerization may be carried out using a slurry polymerization employing an inert hydrocarbon solvent such as propane, butane, pentane, hexane, heptane or octane, or without a solvent. Further, the polymerization may be carried out in the vapor phase of olefins.

The present invention is illustrated further by reference to the following examples, which are not, however, to be interpreted as limiting the present invention. Unless otherwise indicated, all parts, percents, ratios and the like are by weight.

EXAMPLE 1

(A) Production of Solid Titanium Trichloride Catalyst

The atmosphere in a 300 ml four-necked flask equipped with a stirrer and a dropping funnel was sufficiently replaced with argon. 10 ml of titanium tetrachloride, 100 ml of toluene and then 15.5 ml of di-n-butyl ether were added thereto. This solution was kept at 25° C. Thereafter, 5.7 ml of diethylaluminum chloride and 15 ml of toluene were charged in the dropping funnel, and the resulting solution was added, over a 30 minute period, to the mixed solution of titanium tetrachloride and di-n-butyl ether in the flask. After the addition was finished, the reaction solution was stirred at 25° C. for an additional 2.5 hours.

A part of the resulting liquid reaction product was subjected to an oxidation-reduction titration and atomic absorption analysis to determine the amount of $Ti^{+3}$ and total amount of $Ti^{+3}$ and $Ti^{+4}$, respectively. The oxidation-reduction titration analysis and atomic absorption analysis were carried out as follows:

The liquid reaction product (5 ml) was decomposed with 10 N-hydrogen chloride aqueous solution (100 ml) under argon atmosphere, potassium thiocyanate aqueous solution (concentration; 25 wt.%, 5 ml) was added thereto and the resulting aqueous solution (sample water) was titrated with 0.1 N-ferric chloride aqueous solution. In the titration, the color of the aqueous solution titrated changed with the order of violet, light violet colourlessness and brown with the addition of ferric chloride aqueous solution. When the color of aqueous solution changed to brown, the addition of ferric chloride aqueous solution was finished. The amount of $Ti^{+3}$ was calculated from the amount of ferric chloride used.

The total amount of $Ti^{+4}$ and $Ti^{+4}$ was also measured by atomic absorption analysis using flameless atomizer (Carbon Rod Atomizer CRA-90 manufactured by Nichiden-Varian Co., Ltd.) and atomic absorption photometer (Hitachi 208 type atomic absorption photometer manufactured by Hitachi Ltd.)

The sample water was diluted with water into the predetermined concentration and injected into a carbon tube equipped with the flameless atomizer under argon stream. The temperature inside the carbon tube was raised step by step thereby vaporizing the solvent and carbonizing the organic compound present in the sample water, finally to 2,250° C. thereby atomizing Ti. And the absorbance of light having a wave length of 336.8 nm was measured using the atomic absorption photometer (lamp; titanium hollow cathode lamp). The total amount of $Ti^{+3}$ and $Ti^{+4}$ was calculated from the absorbance.

The content of $Ti^{+4}$ and $Ti^{+3}$ in the resulting liquid reaction product was thus measured, and 100% $Ti^{+3}$ alone (based on 1 mole of titanium tetrachloride charged) was detected. Completion of the reduction was thus confirmed. After stirring further for 30 minutes thereafter, 2.31 g of iodine was added to the solution, and the temperature of the reaction solution was increased to 100° C. over a 1 hour period, followed by stirring at 100° C. for 1 hour additionally. Separation, washing and drying under reduced pressure were then carried out to obtain 14.5 g of a solid titanium trichloride catalyst.

The composition and specific surface area of this solid titanium trichloride catalyst were as follows: aluminum: 0.72% by weight (converted to an aluminum chloride basis); di-n-butyl ether: 8.7% by weight; iodine: 0.65% by weight; and specific surface area: 5 m²/g.

(B) Polymerization of Propylene

The atmosphere in a 5 liter autoclave equipped with an electromagnetic stirrer was replaced with argon, and 1.5 g of diethylaluminum chloride and 50 mg of the solid titanium trichloride catalyst obtained in (A) above were charged in the autoclave together with 100 ml of heptane. Thereafter, hydrogen corresponding to a partial pressure of 0.53 kg/cm² and then 1.4 kg of liquid propylene were charged therein under pressure. The contents of the autoclave was kept at 70° C. for 4 hours with stirring. The excess propylene was purged and 2 liters of methanol was added to decompose the catalyst. The produced polymer was filtered and dried at 60° C. under reduced pressure to obtain 680 g of a polymer. The catalytic activity of the solid titanium trichloride catalyst, Rp, was 3,400 per gram of catalyst per hour.

Further, the boiling heptane-insoluble portion (referred to as "II" hereinafter) of the polymer was measured by extracting the polymer with boiling heptane for 8 hours in an improved Soxhlet extractor. The value of II was 98.3%. The bulk density of the polymer was measured and was found to be 0.42 g/ml. The intrinsic viscosity of the polymer in tetralin at 135° C. (referred to as $[\eta]$ hereinafter) was 1.96.

Comparative Example 1

Solid titanium trichloride was produced in exactly the same manner as in (A) of Example 1 except that the iodine was not added. This solid titanium trichloride contained 2.7% by weight of aluminum (converted to an aluminum chloride basis) and 9.1% by weight of di-n-butyl ether.

Propylene was polymerized in accordance with the polymerization (B) of Example 1 using this solid titanium trichloride. Rp=2,480. II=94.2%. Bulk density=0.28 g/ml. $[\eta]$=1.98. From the above results, the difference in catalyst composition and the effect on improving the catalytic activity and the stereoregularity and bulk density of the polymer produced are clearly observed.

Comparative Examples 2 and 3

Solid titanium trichloride catalysts were produced in the same manner as in Example 1 except that the reduction temperature was as 30° C. and the reduction periods after the addition of diethyl aluminum were 30 minutes and 1 hour, respectively.

Polypropylene was produced in the same manner as in Example 1 using the solid catalyst. The results are shown in the Table.

EXAMPLES 2 and 3

Solid titanium trichloride catalysts were produced in the same manner as in Comparative Example 2 except the reduction periods were 90 minutes and 2 hours, respectively. The results are shown in the Table.

TABLE

| Example No. | Reduction Temperature (°C.) | Reduction period after addition of DEAC* (hour) | Reduction reaction conversion (%) | Amount of iodine contained in solid titanium trichloride catalyst | Rp $\left(\frac{\text{g-polymer}}{\text{g-TiCl}_3 \cdot \text{hr}}\right)$ | II (%) | Bulk density (g/cc) |
|---|---|---|---|---|---|---|---|
| Example 1 | 25 | 2.5 | 100 | 0.65 | 3,400 | 98.3 | 0.42 |
| Example 2 | 30 | 1.5 | 94 | 0.60 | 3,310 | 98.2 | 0.43 |
| Example 3 | 30 | 2.0 | 100 | 0.68 | 3,520 | 98.3 | 0.43 |
| Comparative Example 1 | 25 | — | — | 0.0 | 2,480 | 94.2 | 0.28 |
| Comparative Example 2 | 30 | 0.5 | 70 | 0.0 | 2,900 | 96.7 | 0.35 |
| Comparative Example 3 | 30 | 1.0 | 75 | 0.0 | 2,940 | 96.8 | 0.37 |

*DEAC: Diethyl aluminum chloride

EXAMPLE 4

A solid titanium trichloride catalyst was produced in exactly the same manner as in (A) of Example 1 except that 3.46 g of iodine was added. The solid titanium trichloride catalyst thus-obtained contained 0.67% by weight of aluminum (converted to an aluminum chloride basis), 7.9% by weight of di-n-butyl ether and 0.87% by weight of iodine, and the specific surface area of the catalyst was 12.1 m²/g.

Propylene was polymerized in accordance with the polymerization (B) of Example 1 using this solid titanium trichloride catalyst. Rp=3,330. II=98.4%. Bulk density=0.43 g/ml. $[\eta]$=1.96.

Comparative Example 4

Solid titanium trichloride was produced in the same manner as in (A) of Example 1 except that iodine was added prior to the addition of the diethylaluminum chloride solution. The solid titanium trichloride obtained contained 2.1% by weight of aluminum (converted to an aluminum chloride basis) and 9.2% by weight of di-n-butyl ether, but no iodine was detected at all in the catalyst.

Propylene was polymerized in accordance with polymerization (B) of Example 1 using this solid titanium trichloride. Rp=2,790. II=96.3%. Bulk density=0.33 g/ml. $[\eta]$=1.95. From the above results, the difference in catalyst composition and the effect of improving the catalytic activity and the stereoregularity and bulk density of the polymer produced are clearly observed.

Comparative Example 5

Ten grams of the solid titanium trichloride obtained in Comparative Example 1 was added to a 200 ml flask in which the atmosphere had been replaced with argon. Thereafter, 50 ml of toluene and 1.65 g of iodine were added to the flask, and the temperature of the mixture was increased to 100° C., followed by stirring at 100° C. for 1 hour. Separation, washing and drying under reduced pressure were carried out to obtain a solid titanium trichloride.

Propylene was polymerized in accordance with polymerization (B) of Example 1 using this solid titanium trichloride. Rp=675. II=93.0%. Bulk density=0.30 g/ml. [η]=1.99.

It is apparent from the result that the improved effect cannot be obtained at all by treatment of the solid titanium trichloride with iodine alone.

EXAMPLE 5

A solid titanium trichloride catalyst was produced in the same manner as in (A) of Example 1 except that 13.2 ml of di-n-butyl ether and 3.00 g of iodine were used. Propylene was polymerized in accordance with polymerization (B) of Example 1 using this solid titanium trichloride catalyst. Rp=3,250. II=98.2% Bulk density=0.42 g/ml. [η]=1.92.

While the invention has been described in detail and with reference to specific embodiments thereof, it will be apparent to one skilled in the art that various changes and modifications can be made therein without departing from the spirit and scope thereof.

What is claimed is:

1. A process for producing an olefin polymer comprising polymerizing an olefin with a catalyst system comprising
    (A) a solid titanium trichloride catalyst produced by the steps of
    (a) at a temperature of −40° C. to 40° C., over a period of 5 minutes to 6 hours, mixing titanium tetrachloride with from 0.2 to 1.1 moles per mole of said titanium tetrachloride of an organoaluminum compound of the formula (I):

$$AlR_nX_{3-n} \quad (I)$$

wherein R has up to 10 carbon atoms and is an aliphatic hydrocarbon group which may be straight chain, branched chain or cyclic, or an aromatic hydrocarbon group; X is a halogen atom or a hydrogen atom; and n is a number satisfying the relation, $1.5 \leq n \leq 3$;
    in the presence of from 0.1 to about 3 moles per mole of said titanium tetrachloride of an ether compound of the formula (II);

$$R^2OR^3 \quad (II)$$

wherein $R^2$ and $R^3$, which may be the same or different, each is an alkyl group, an aralkyl group or an alkenyl group, each having up to 10 carbon atoms, to reduce the titanium tetrachloride;
    (b) maintaining the mixed solution at a temperature of 10° C. to 50° C. for 1.5 to 6 hours thereby performing the reduction;
    (c) at the time when the reduction proceeds at least 90%, adding iodine in an amount of 0.01 to about 1 mole of said titanium tetrachloride to the resulting liquid titanium trichloride product;
    (d) maintaining the resulting mixture at about 30° C. to about 150° C. thereby precipitating solid titanium trichloride; and
    (e) then separating the solid titanium trichloride catalyst, and (B) an activating agent of the formula (III);

$$AlR'_mY_{3-m} \quad (III)$$

wherein R' has up to 10 carbon atoms and is an aliphatic hydrocarbon group which may be straight chain, branched chain or cyclic, or an aromatic hydrocarbon group; Y is a halogen atom or a hydrogen atom and m is a number satisfying the relation, $1 \leq m \leq 3$.

2. The process of claim 1, wherein $R^2$ and $R^3$ of said ether compound of the formula (II), each is an alkyl group having 2 to 5 carbon atoms.

3. The process of claim 2, wherein said ether compound of the formula (II) is di-n-butyl ether.

4. The process of claim 1, wherein said organoaluminum compound of the formula (I) is selected from the group consisting of an alkylaluminum sesquihalide, a dialkylaluminum halide, a trialkylaluminum and a dialkylaluminum hydride.

5. The process of claim 4, wherein said organoaluminum compound of the formula (I) is diethylaluminum chloride.

6. The process according to claim 1, wherein the chemical equivalent of the organo-aluminum compound is about 1 to 1.2 times of that of titanium tetrachloride.

7. The process of claim 1, wherein said amount of said ether compound of the formula (II) is 0.5 to 1.5 moles per mole of titanium tetrachloride.

8. The process of claim 1, wherein mixing is carried out at a temperature of about −20° C. to about 40° C.

9. The process of claim 1, wherein the mixed solution is maintained at a temperature of 20° C. to 50° C.

10. The process of claim 1, wherein the iodine is added after the reduction has proceeded at least 95%.

11. The process of claim 2, wherein the iodine is added at the time when the reduction is completed.

12. The process of claim 1, wherein the amount of iodine is 0.03 to 0.5 mole per mole of titanium tetrachloride.

13. The process of claim 1, wherein said treatment with the mixture of iodine and the ether compound is at a temperature of about 50° C. to about 150° C.

14. The process of claim 13, wherein said treatment is at 80° C. to 130° C.

15. The process of claim 1, wherein said solid titanium trichloride catalyst is represented by the formula:

$$TiCl_3(AlCl_3)_p(E)_q(I)_r$$

wherein E is an ether compound represented by the formula $R^2OR^3$ wherein $R^2$ and $R^3$, which may be the same or different, each is an alkyl group, an aralkyl group or an alkenyl group, each having up to 10 carbon atoms and p, q and r are numbers satisfying the relations, $0<p<0.02$, $0<q<0.15$ and $0.001<r<0.05$.

16. The process of any one of claims 1 to 15, wherein said activating agent is a dialkylaluminum halide, a trialkylaluminum or a dialkylaluminum hydride.

17. The process of claim 16, wherein said activating agent is diethylaluminum chloride.

* * * * *